United States Patent [19]
Suzuki et al.

[11] Patent Number: 6,145,173
[45] Date of Patent: Nov. 14, 2000

[54] ARTICLE ATTACHING DEVICE

[75] Inventors: Takeshi Suzuki; Yasuhiko Inoue, both of Osaka, Japan

[73] Assignee: Nifco Inc., Yokohama, Japan

[21] Appl. No.: 09/244,777

[22] Filed: Feb. 5, 1999

[30] Foreign Application Priority Data

Feb. 9, 1998 [JP] Japan ................................. 10-026994

[51] Int. Cl.[7] ................................. F16B 21/07; F16B 7/04
[52] U.S. Cl. ..................... 24/662; 248/503.1; 24/573.1; 411/508; 411/182; 403/329; 403/386; 296/63
[58] Field of Search ............................ 24/662, 663, 573, 24/570, DIG. 29; 403/329, 386, 326, 263, 247; 248/503.1; 296/63, 65.1; 297/378, 13, 463.1, 463.2; 411/182, 508; 410/116

[56] References Cited

U.S. PATENT DOCUMENTS

| | | | |
|---|---|---|---|
| 4,742,984 | 5/1988 | Cote et al. ........................... | 248/503.1 |
| 4,822,092 | 4/1989 | Sweers ................................ | 296/63 |
| 4,865,505 | 9/1989 | Okada ................................. | 411/508 X |
| 4,927,306 | 5/1990 | Sato .................................... | 411/182 |
| 5,429,467 | 7/1995 | Gugle et al. ........................ | 411/182 |
| 5,533,237 | 7/1996 | Higgins .............................. | 411/508 X |
| 5,606,784 | 3/1997 | Hamamoto ........................ | 24/662 |
| 5,649,783 | 7/1997 | Ichikawa et al. .................. | 403/386 |
| 5,788,314 | 8/1998 | Hayes et al. ...................... | 296/63 |
| 5,890,831 | 4/1999 | Kato .................................. | 403/329 |

*Primary Examiner*—Robert J. Sandy
*Attorney, Agent, or Firm*—Kanesaka & Takeuchi

[57] ABSTRACT

An article attaching device is used for attaching, for example, a rear seat to an under panel of an automobile. The article attaching device is inserted into an attaching hole of the under panel to be fixed thereto, and then a hook fixed to the rear seat is inserted into the box portion to engage engaging portions provided on opposed inner sides of the box portion. The engaging portions opposing each other are shifted in the horizontal direction not to overlap each other. Thus, an article, i.e. hook, can be easily inserted into the article attaching device while providing a high extracting force of the article, which results in good workability.

10 Claims, 4 Drawing Sheets

ARTICLE ATTACHING DEVICE

BACKGROUND OF THE INVENTION AND RELATED ART STATEMENT

The present invention relates to an article attaching device for attaching an article to a basic member or member, wherein the article attaching device is first attached to the member and then the article is attached to the member by inserting a hook fixed to the article from an open upper surface of a box portion of the article attaching device to engage engaging portions of the article attaching device.

In a prior art, an article attaching device inserted into an attaching hole of a base member or member, such as an under panel of an automobile, is attached to the member by holding the under panel between a flange and attaching pawl portions provided to an outer circumference of a box portion of the article attaching device, and engaging portions engaging a hook inserted from an open upper surface of the box portion are provided to opposed inner sides of the box portion.

Therefore, the article attaching device is attached to the under panel, and the hook fixed to a rear seat is inserted from the open upper surface of the article attaching device to be engaged with the engaging portions. Thus, the rear seat can be attached to the under panel. Incidentally, the article attaching device as described above is disclosed in Japanese Patent Publication (KOKAI) No. 8-35509.

In the conventional article attaching device, the engaging portions are provided on the opposed inner sides of the box portion so that the respective engaging portions overlap in the same area in a horizontal direction parallel to the opposed inner sides. Also, inclined surfaces for guiding the hook are provided at the opposed upper portions of the engaging portions so that a space between the opposed engaging portions is gradually reduced from an upper side toward a lower side to thereby decrease a force for inserting the hook between the opposed engaging portions.

However, in case the hook is inserted between the engaging portions, since the space between the engaging portions has to be widened uniformly so that the hook can pass therethrough, if the engaging portions face each other in the same area in the horizontal direction, large force is required. For example, the insertion force for inserting the hook between the engaging portions is 226 Newton (hereinafter referred to as "N") and an extracting force for extracting the hook between the engaging portions is 276N, the difference between the two forces being extremely small. Since the large inserting force of 226N is required, workability of the article attaching device is bad.

The present invention has been made to solve the above problems, and an object of the invention is to provide an article attaching device, wherein an article can be easily engaged with the article attaching device.

Another object of the invention is to provide an article attaching device as stated above, wherein while an extracting force for extracting the article from the article attaching device is large sufficient to keep engagement of the article with article attaching device, a difference between the extracting force and an insertion force for inserting the article to the article attaching device is large.

A further object of the invention is to provide an article attaching device as stated above, wherein the article attaching device has good workability.

Further objects and advantages of the invention will be apparent from the following description of the invention.

SUMMARY OF THE INVENTION

An article attaching device of the invention includes a box portion, and engaging portions provided on opposed inner surfaces of the box portion. The engaging portions are shifted in a horizontal or lateral direction parallel to the opposed inner surfaces. When the article attaching device is used, the box portion is inserted into an attaching hole of a member to hold the member between a flange and attaching pawl portions provided on an outer circumference thereof, so that the box portion is attached to the member. Then, a hook is inserted between the engaging portions to engage the engaging portions.

The engaging portions may be shifted in the horizontal direction parallel to the opposed inner surfaces not to overlap each other. Also, each engaging portion may be formed of a plane surface portion parallel to the opposed inner surfaces, and an inclined surface portion disposed adjacent to the plane surface portion, wherein the plane surfaces and the inclined surfaces disposed at the opposite sides are shifted not to overlap each other in the horizontal direction.

DETAILED DESCRIPTION OF PREFERRED EMBODIMENTS

Hereinunder, embodiments of the present invention are described with reference to the attached drawings.

Figure 1:
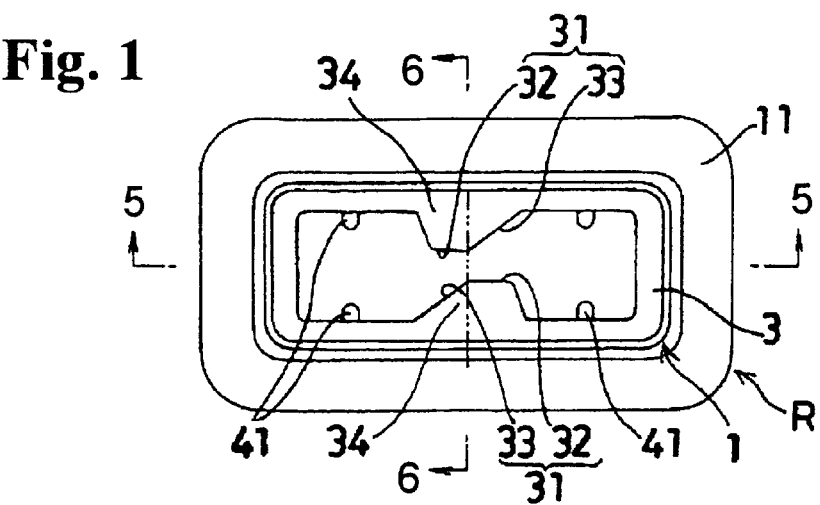
FIG. 1 is a plan view for showing a first embodiment of an article attaching device according to the present invention.
Figure 2:
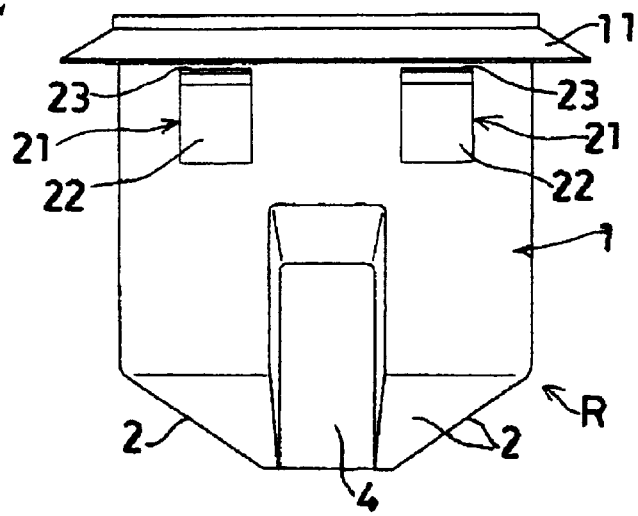
FIG. 2 is a front view of the article attaching device shown in FIG. 1.
Figure 3:
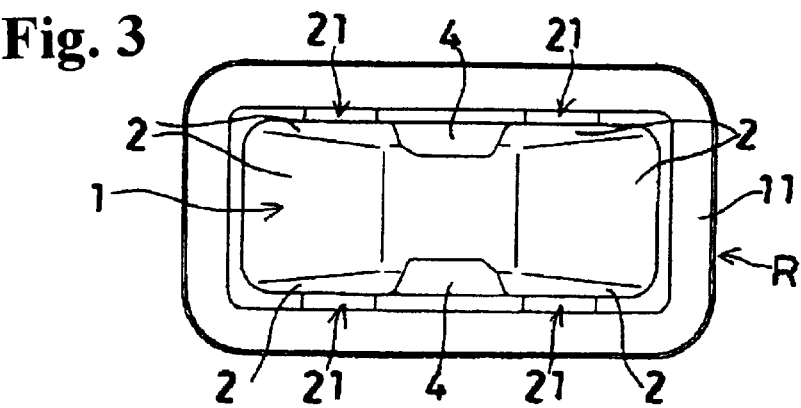
FIG. 3 is a bottom view of the article attaching device shown in FIG. 1.
Figure 4:
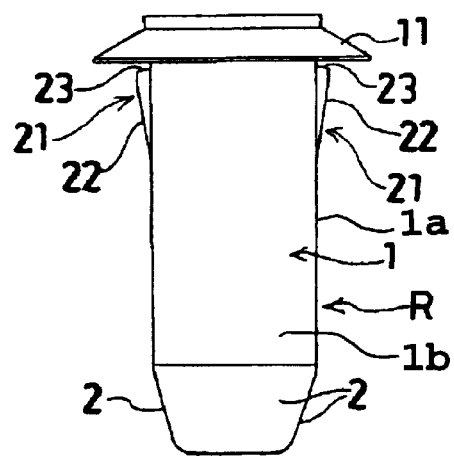
FIG. 4 is a right side view of the article attaching device shown in FIG. 1.

In the drawings, FIG. 1 is a plan view for showing a first embodiment of an article attaching device; FIG. 2 is a front view; FIG. 3 is a bottom view; and FIG. 4 is a right side view. A rear view, i.e. back side view, of the article attaching device of FIG. 1 is the same as the front view shown in FIG. 2, and a left side view of the article attaching device shown in FIG. 1 is the same as the right side view shown in FIG. 4.

Figure 7:
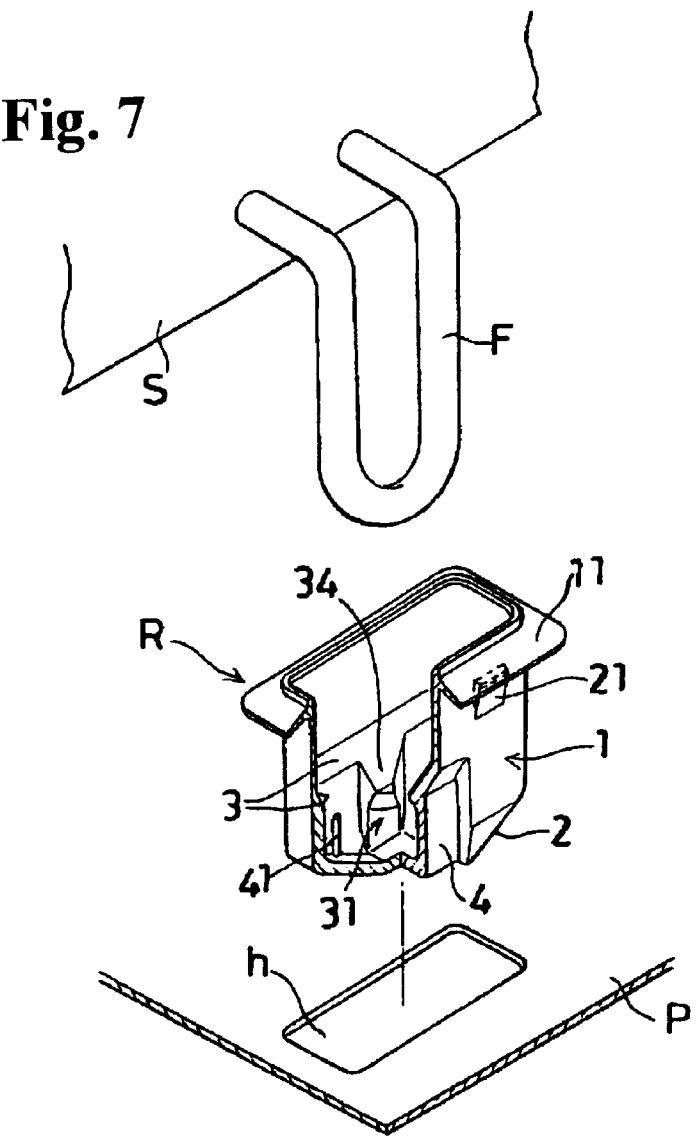
FIG. 7 is an exploded perspective view for showing usage of the article attaching device shown in FIG. 1.
Figure 9:
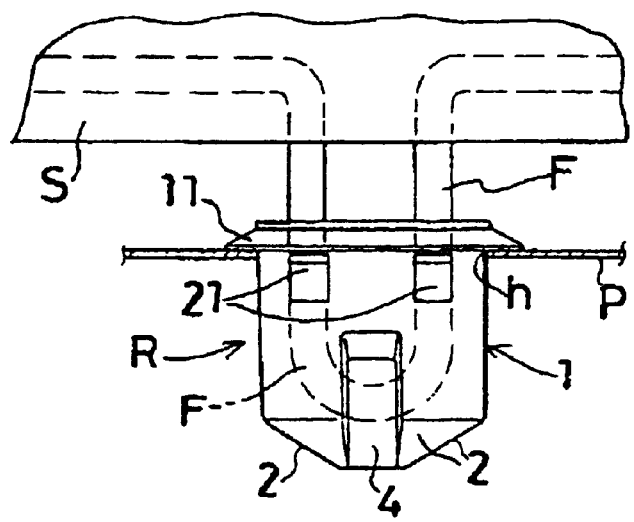
FIG. 9 is a front view for showing an engaging state of the hook and the article attaching device shown in FIG. 1.

In FIGS. 7 and 9, reference symbol P is an under panel of an automobile as a member to which an article is attached, wherein a rectangular attaching hole h is formed. S represents a rear seat as an article, and F is a hook fixed to the rear seat S. The hook F is formed of, for example, a steel wire and a portion to be inserted into the article attaching device R is bent in a U-shape. R shows the article attaching device which is used for attaching the rear seat S to the under panel P.

The article attaching device R is further explained with reference to FIGS. 1 through 6 and FIG. 8. The article attaching device R includes a box portion 1 having a rectangular shape in plan with long sides 1a and short sides 1b and an opening at its upper surface; a flange 11 disposed on an upper end of the box portion 1, which has a predetermined width along a circumference of the box portion 1 and expands outwardly and downwardly; attaching pawl portions 21 disposed on outer surfaces of the box portion 1 corresponding to respective longer sides thereof, wherein two attaching pawl portions 21 are provided to each longer surface so that the under panel P can be held between the flange 11 and the attaching pawl portions 21; engaging portions 31 provided in a vertical direction at lower sides of the inner surfaces corresponding to the respective longer sides of the box portion 1; and pressing portions or ribs 41 provided in the vertical direction on both sides of each engaging portion 31 on the inner surfaces corresponding to the respective longer sides of the box portion 1. These components are formed integrally with a resin.

Figure 5:
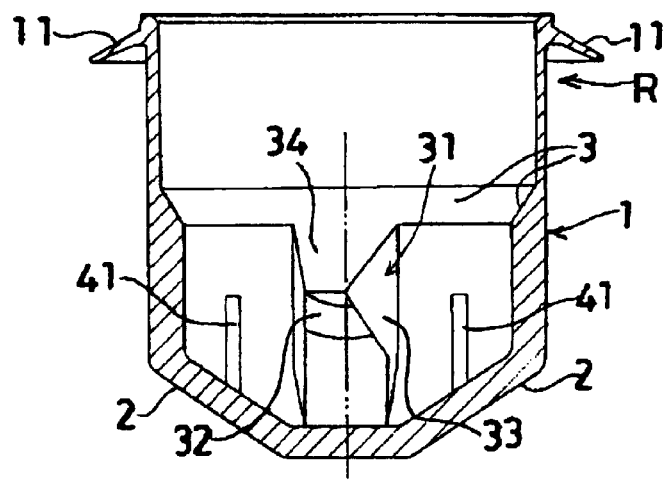
FIG. 5 is a sectional view taken along line 5—5 in FIG. 1.
Figure 6:
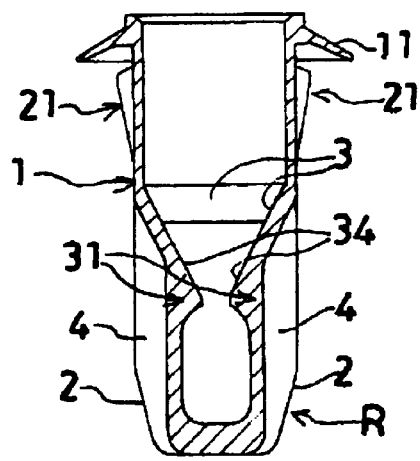
FIG. 6 is a sectional view taken along line 6—6 in FIG. 1.

In order to easily insert the box portion 1 into the attaching hole h, as shown in FIGS. 2, 4 through 6, the box portion 1 is provided, at the lower portions of two opposed surfaces, with inclined surfaces 2 which are gradually narrowed or tapered toward the lower side. Also, in order to guide the hook F to the engaging portions 31, as shown in FIGS. 1, 5 and 6, inclined surfaces 3 gradually narrowing or tapering toward the lower side is provided along the inner surfaces at an upper side of the engaging portions 31.

As shown in FIGS. 4 and 6, each attaching pawl portion 21 has an inclined surface 22 to be gradually thickened toward the flange 11, and an upper edge 23 facing the flange 11 is formed to have a plane surface.

Figure 8:
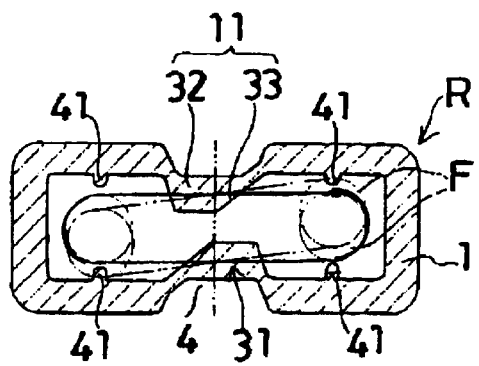
FIG. 8 is an explanatory view for showing an engaging state of a hook between the engaging portions.

Also, as shown in FIGS. 1, 5 and 8, each engaging portion 31 includes a plane surface portion 32 and an inclined surface portion 33 situated in a horizontal direction, i.e. in the left and right direction in FIG. 5. The plane surface portions 32 and the inclined surface portions 33 facing each other are, as shown in FIGS. 1 and 8, shifted or deviated not to overlap with each other. Also, upper portions of the respective engaging portions 31 form inclined surfaces 34 extending from the inclined surfaces 3.

Incidentally, depressed portions 4 are provided in a vertical direction from the middle parts to lower ends on outer sides of the box portion 1 corresponding to the respective engaging portions 31.

In case the article attaching device R is attached to the under panel P, as shown in FIG. 7, when a lower side of the article attaching device R is inserted into the attaching hole h, since the lower end portion of the box portion 1 is provided with the inclined surfaces 2, the article attaching device R can be easily inserted into the attaching hole h through guidance of the inclined surfaces 2.

Then, when the lower sides of the respective attaching pawl portions 21 abut against the under panel P, the article attaching device R is pressed so that the inclined surfaces 22 of the respective attaching pawl portions 21 are pushed by the under panel P and the box portion 1 is bent inward. The box portion 1 is inserted into the attaching hole h until the flange 11 contacts the under panel P with pressure.

As described above, when the box portion 1 is inserted into the attaching hole h and the upper edges 23 of the respective engaging pawl portions 21 pass through the under panel P, as shown in FIG. 9, the box portion 1 returns to an original state by its own elasticity. Therefore, the upper edges 23 of the respective engaging pawl portions 21 are located under the lower side of the under panel P to thereby support the under panel P between the flange 11 and the upper edges 23 of the respective engaging pawl portions 21. Thus, the article attaching device R can be attached to the under panel P.

Next, in case the rear seat S is attached to the under panel P, as shown in FIG. 7, a lower side of the hook F is inserted into the open upper surface of the article attaching device R attached to the under panel P so that the hook F is guided by the inclined surfaces 3, 34 and abuts against the engaging portions 31, as shown by a solid line in FIG. 8.

Then, when the hook F abutting against the engaging portion 31 is pressed through the rear seat S, since the respective plane surface portions 32 and the respective inclined surface portions 33 are shifted so that they do not overlap each other in the horizontal direction, as shown by a two-dotted chain line in FIG. 8, the hook F slightly rotates between the engaging portions 31 and widens a space therebetween by bending the box portion 1. Thus, the hook F can pass between the engaging portions 31.

As described above, when the hook F passes between the engaging portions 31, the box portion 1 returns to the original state by its own elasticity, so that the space between the engaging portions 1 is narrowed, and the hook F is engaged with the engaging portions 31, as shown in FIG. 9 as well as by the solid line in FIG. 8. Thus, the rear seat S can be attached to the under panel P through the article attaching device R. At this time, the pressing portions 41 face the hook F to prevent rotation.

As described above, in case the hook F bends the box portion 1 while slightly rotating between the engaging portions 31 to widen the space therebetween, as the opposed plane surface portions 32 are shifted or spaced in the horizontal direction not to overlap each other, the hook F does not push the box portion 1 too much because of the inclined surface portions 33. Namely, the space between the engaging portions 31 to be widened for passing the hook F therethrough can be made small, so that a force for inserting the hook F can be reduced.

Also, since the inclined surface portion 33 is connected to the plane surface portion 32, the inclined surface portion 33 operates to increase a force for extracting the hook F. Thus, it is possible to provide the sufficient extracting force, i.e. withstanding force against extraction, even if a length in the horizontal direction of the plane surface portion 32 is short.

Here, as examples of the inserting force and the extracting force of the hook F in the first embodiment, inserting force was 136.6N, and extracting force was 225.4N. Since the difference between both forces is great and the extracting force is far over 200N, it is possible to provide the article attaching device having a sufficient extracting force and good workability.

By the way, it is considered that the reason why the extracting force of 225.4N in the present invention is smaller than 276N in the prior art is due to decrease in the extracting force by the inclined surface portions 33.

Also, although the plane surface portions 32 and the inclined surface portions 33 of the engaging portions 31 facing each other are shifted so that they do not overlap each other in the horizontal direction, if the plane surface portions 32 are shifted not to overlap each other in the horizontal direction, the inclined surface portions 33 may overlap each other in the horizontal direction to obtain the same effect.

Figure 10:
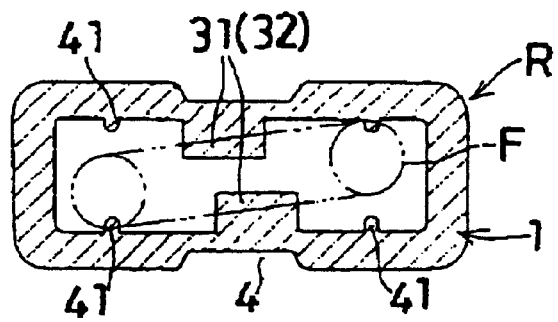
FIG. 10 is an explanatory sectional view of a second embodiment of an article attaching device according to the present invention.

FIG. 10 is an explanatory view of a second embodiment of an article attaching device according to the present invention, wherein the same portions as those shown in FIGS. 1 through 9 or portions corresponding thereto are designated by the same symbols or numerals, and descriptions thereof are omitted.

Incidentally, a difference between the first embodiment and the second embodiment reside in that the engaging portions 31 in the second embodiment include only the plane surface portions 32, and although the engaging portions 31 are shifted in the horizontal direction, parts of them overlap each other.

Figure 11:
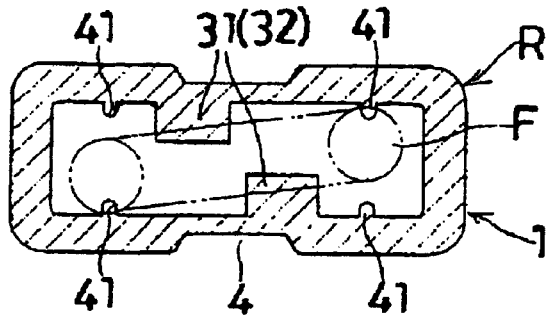
FIG. 11 is an explanatory sectional view of a third embodiment of an article attaching device according to the present invention.

FIG. 11 is an explanatory view of a third embodiment of an article attaching device according to the present invention, wherein the same portions as those shown in FIGS. 1 through 9 or portions corresponding thereto are designated by the same symbols or numerals, and descriptions thereof are omitted.

Incidentally, a difference between the first embodiment and the third embodiment resides in that the engaging portions 31 are formed of only the plane surface portions 32.

As shown in FIGS. 10 and 11, when the engaging portions 31 are shifted in the horizontal direction, as shown by a two-dotted chain line, in case the box portion 1 is bent to widen the space between the engaging portions 31 while slightly rotating the hook F between the engaging portions 31, the width between the engaging portions 31 to be widened for passing the hook F therethrough can be reduced, so that the force for inserting the hook F can be made smaller than that of the prior art.

As a result, the extracting force close to that in the prior art can be obtained.

As described hereinabove, according to the present invention, the engaging portions are shifted in the horizontal direction parallel to opposed inner surfaces of the box portion. In this case, when the space between the engaging portions is widened by bending the box portion while slightly rotating the hook between the engaging portions, the space to be widened between the engaging portions for passing the hook can be reduced. Therefore, the inserting force of the hook can be made smaller than that in the prior art, while the article attaching device of the invention has the extracting force close to that in the prior art, which results in good workability.

Also, the engaging portions may be shifted not to overlap each other in the horizontal direction parallel to the opposed inner surfaces of the box portion. In this case, when the space between the engaging portions is widened by bending the box portion while slightly rotating the hook between the engaging portions, the width for widening the space between the engaging portions for passing the hook therethrough can be further reduced and the insertion force of the hook is also decreased, so that the article attaching device has good workability.

Further, each engaging portion may be formed of the plane surface portion and an inclined surface portion connected in the horizontal direction parallel to the opposed inner surfaces of the box portion, and the respective plane surface portions and the respective inclined surface portions may be shifted not to overlap in the horizontal direction. In this case, when the space between the engaging portions is widened by bending the box portion while slightly rotating the hook between the engaging portions, the width for passing the hook to widen the space between the engaging portions and the inserting force of the hook can be further reduced, so that the article attaching device has good workability.

While the invention has been explained with reference to the specific embodiments of the invention, the explanation is illustrative, and the invention is limited only by the appended claims.

What is claimed is:

1. An article attaching device comprising:
   a box portion having an upper opening and opposed inner surfaces extending from the upper opening;
   engaging means formed on an outer periphery of the box portion for fixing the box portion to a base member; and
   engaging portions provided on the opposed inner surfaces of the box portion, said engaging portions being arranged to be deviated laterally from each other along the opposed inner surfaces so that when a hook to be fixed to an article is inserted between the engaging portions through the upper opening, the engaging portions allow the hook to be displaced diagonally relative to the opposed inner surfaces and to be inserted easily between the engaging portions.

2. An article attaching device according to claim 1, wherein said respective engaging portions are shifted in the horizontal direction parallel to the opposed inner surfaces so that they do not overlap each other.

3. An article attaching device according to claim 1, wherein each of said engaging portions is formed of a plane surface portion parallel to the opposed inner surfaces and an inclined surface portion extending from the plane surface portion to one of the opposed inner surfaces where the engaging portion is formed, the plane surface portions and the inclined surface portions opposing each other being shifted not to overlap each other in horizontal directions.

4. An article attaching device according to claim 1, further comprising a plurality of ribs formed on the inner surfaces of the box portion on both sides of the respective engaging portions.

5. An article attaching device according to claim 1, further comprising an inclined surface formed along the inner surface of the box portion and located above the engaging portions, each engaging portion having an inclined upper surface extending downwardly from the inclined surface.

6. An article attaching device according to claim 1, wherein said engaging means includes a flange disposed at an outer circumference of the box portion, and a plurality of attaching pawls disposed at the outer circumference of the box portion with a space relative to the flange.

7. An article attaching device according to claim 1, wherein the respective engaging portions are arranged parallel to the opposed inner surfaces of the box portion.

8. An article attaching device according to claim 1, wherein said engaging portions face asymmetrically each other relative to a plane between the opposed inner surfaces.

9. An article attaching device according to claim 1, wherein each of said engaging portions includes a plane surface portion situated parallel to the opposed inner surfaces, said plane surface portions formed at the respective inner surfaces facing each other to be deviated laterally.

10. An article attaching device according to claim 1, wherein said box portion further includes opposed sides perpendicular to the opposed inner surfaces, a distance from one of the opposed sides to one of the engaging portions being different from a distance from said one of the opposed sides to the other of the engaging portions.

* * * * *